United States Patent

[11] 3,588,877

[72] Inventor Arthur Thomas Keefe
London, England
[21] Appl. No. 691,898
[22] Filed Dec. 19, 1967
[45] Patented June 28, 1971
[73] Assignee Evershed & Vignoles Limited
Chiswick, London, England
[32] Priority Dec. 19, 1966
[33] Great Britain
[31] 56766/66

[54] ANALOGUE-TO-DIGITAL CONVERTERS
5 Claims, 2 Drawing Figs.
[52] U.S. Cl. ................................................. 340/347
[51] Int. Cl. ............................................... H03k 13/20
[50] Field of Search ........................................... 340/347

[56] References Cited
UNITED STATES PATENTS
2,630,481  3/1953  Johnson .................. 340/347X
2,980,900  4/1961  Rabin ..................... 340/347
3,091,755  5/1963  Sanner et al. ............. 340/347X
3,315,253  4/1967  Geller .................... 340/347

Primary Examiner—Maynard R. Wilbur
Assistant Examiner—Gary R. Edwards
Attorney—Kemon, Palmer and Estabrook ABSTRACT: In an electronic analogue-digital converter for converting coarse-fine analogue signals into digital form, both signals are converted to pulses the durations of which are linearly related to the coarse and fine voltage levels. The coarse pulse is extended by a bias duration equivalent to a part of a unit. The fine pulse gates a clock pulse train into a counter and the total count is decoded and subtracted from the extended coarse pulse. The resultant coarse pulse gates a clock train into a counter. The coarse count or units total and the fine count or remainder are displayed on indicators. The bias or offset applied to the coarse signal avoids ambiguity in its units representation when the fine signal has been subtracted. The coarse and fine signals may be derived from potentiometers in a liquid level gauge.

ANALOGUE-TO-DIGITAL CONVERTERS

This invention relates to electronic analogue-to-digital converters. In particular it is concerned with the conversion into digital form of a first electrical analogue signal proportional to a number of units and a second electrical analogue signal proportional to the sum of the number of units and a number of multiples of the units.

Such signals may represent a varying height, the units being for instance millimeters or inches and the multiple meters or feet, respectively. As the height increases, the first signal representative of millimeters or inches changes linearly from a first value to a second value over 1 meter or foot, respectively, and then instantaneously returns to the first value to repeat the process. Meanwhile the second signal representative of meters and millimeters, or feet and inches, changes linearly. In other words the first signal varies in amplitude in the manner of a sawtooth wave while the second signal varies linearly in amplitude with the height.

Signals of this type are produced by one form of the gauge described in our copending Pat. application Ser. No. 520,533 for measuring the surface level of a liquid, in particular oil in a storage tank. Such a gauge may for instance have a range of 25 meters and include two potentiometers geared together to rotate with the measured level. The first potentiometer, which is of the continuous turn-type, provides the millimeters signal. It has a resistance which varies in the manner of a sawtooth wave. The second potentiometer is of the 10 turn helical-type and provides the meters signal. The resistance of this potentiometer varies linearly.

With such an arrangement, it would be possible for the first potentiometer to be geared to the second by a 2.5:1 gear ratio. In other words, 1 revolution of the first potentiometer is made equivalent to 1 meter and 1 revolution of the other potentiometer is made equivalent to 2.5 meters. A major difficulty of this is that as a normal potentiometer cannot accurately resolve to less than approximately 1 percent of its range, the resolution of the millimeters signal is limited to approximately 10 millimeters. For many applications this is not low enough.

Another less important disadvantage is concerned with ambiguity of the resulting reading. It will be appreciated that the resistance of the first potentiometer is measured and the resulting signal is used to operate a millimeters indicator. The resistance of the second potentiometer could be used directly to operate a meters indicator but as its resistance increases linearly as opposed to step-wise, a meters indicator connected in this way would be difficult to read, i.e. the reading would be ambiguous. For this reason a feedback system has to be provided to cause the reading of the meters indicator to increase in integral steps.

The same kind of gauge may naturally be designed to provide signals for indicating the level in feet and inches instead of in meters and millimeters. For instance it may have a range of 60 feet in which case the first or inches potentiometer conveniently rotates at six times the speed of the second or feet potentiometer. The latter thus rotates once for each 6 feet. Again the "multiples" indicator, i.e. the feet indicator, would be difficult to read if connected directly to the second potentiometer and hence a feedback system is again provided.

It can hence be seen that a separate feedback system has to be provided for each gauge. If there are an appreciable number of gauges, the total cost of the feedback systems becomes very appreciable. Another disadvantage of feedback systems is that a very slight fault or misalignment results in the multiples (e.g. meters or feet) indicator making a retarded or premature change in relation to the units indicator. As a consequence any reading taken at that instant is incorrect by approximately one multiple. This could have extremely serious consequences.

The present invention is based on the realization that these disadvantages can be overcome by replacing the feedback system or systems with an analogue-to-digital converter comprising means for producing a first pulse having a length proportional to the amplitude of the first signal (the signal proportional to the number of units, e.g. millimeters), means for producing a second pulse having a length proportional to the amplitude sum of the second signal (the signal proportional to the sum of the number of units, e.g. millimeters, and the number of multiples of the units, e.g. meters) and a constant proportional to less than one of the multiples, a first digital indicator for indicating the length of the first pulse and thus the number of units in digital form, means for producing a signal indicative of the reading of the first indicator in the form of a fraction of one of the multiples, means for counting the latter signal into a binary counter, means for subtracting the signal in the counter from a signal proportional to the length of the second pulse to give a third pulse having a length proportional to the number of multiples and the constant term, and a second digital indicator for indicating the length of the third pulse in digital form, excluding the digit representing the said constant, thereby indicating the integral number of the multiples.

The invention is best understood by considering an example in which the units are assumed to be millimeters and the multiples meters. In this case the first pulse has a length proportional to the number of millimeters. The second pulse has a length proportional to the sum of the number of meters, the number of millimeters and a constant term of less than 1 meter, preferably 500 millimeters. The first pulse has its length measured by the first digital indicator which as a result indicates the number of millimeters. This number now has to be subtracted from the sum referred to above. This is achieved by converting it into a fraction, for example one-tenth, of a meter and subtracting this fraction in the binary counter from a signal proportional to the length of the second pulse to produce a third pulse. This is done in such a way that the factors of proportionality are correct so that the third pulse has a length proportional to the sum of the number of meters and the constant term. This pulse then has its length measured by the second digital indicator. If this indicator indicated the measured length, the number of meters would be indicated together with a fraction of a meter proportional to the constant term. However the last digit which represents the fraction is not indicated and accordingly only the integral number of meters is indicated.

It is clear from this description that one feature of the converter is that the millimeters reading is subtracted from the meters and millimeters reading so that the latter reading is only of the integral number of meters thus avoiding one of the previously mentioned difficulties. It is also clear that a constant term, i.e. an "offset," is added to the meters reading but is not subsequently displayed on the meters indicator. The purpose of this is to prevent the indicator giving an erroneous reading due to retarded or advanced receipt of the second analogue signal. As just indicated the constant term may be 500 millimeters in which case the meters indicator registers the meters reading together with 500 millimeters. However as the last digit is not displayed, this is of no consequence but the principle results in the meters reading being centered about the constant term so that an error of up to 500 millimeters does not affect the meters reading, or for that matter the millimeters reading. If this constant term was not present then a slight error in the subtraction process might as already mentioned easily result in the meters indicator reading one digit less than the correct value.

As just described, each unit is a millimeter and each multiple a meter. However, for reasons previously mentioned, such an arrangement may in certain applications not give a sufficiently good resolution because 1 revolution of the potentiometer providing the millimeters signal represents a complete meter. This can be improved in accordance with a further feature of the invention by making 1 revolution representative of a smaller quantity. This in effect means considering each multiple to consist of a smaller quantity. It is particularly convenient if each multiple is taken as 200 millimeters, i.e. a double decimeter. This has the effect of increasing the resolution fivefold. Each unit naturally remains as a millimeter. The constant term which as previously indicated is preferably half a multiple is in this case therefore 1 decimeter.

A converter in accordance with the invention can be used to periodically sample a number of pairs of analogue signals and, by means of suitable gating circuits, to display a digital indication of their value on respective indicators. Such an arrangement could for instance be used to periodically sample the liquid surface level of a number of tanks each having a gauge of the type described in our copending patent application previously referred to. With such an arrangement the interval between sampling of each tank can be extremely short, for example of the order of several milliseconds, so that in effect the surface level is continuously indicated. Other variables can of course be indicated such as temperature. However a single converter can serve to indicate the several variable quantities of an appreciable number of tanks. It will be appreciated that this results in a considerable reduction in costs as compared with conventional feedback systems where a separate system is required for each tank. Moreover as will be apparent a large improvement in accuracy can be obtained.

By way of example a converter in accordance with the invention will now be described in more detail with reference to the accompanying drawings in which.

Figure 1:
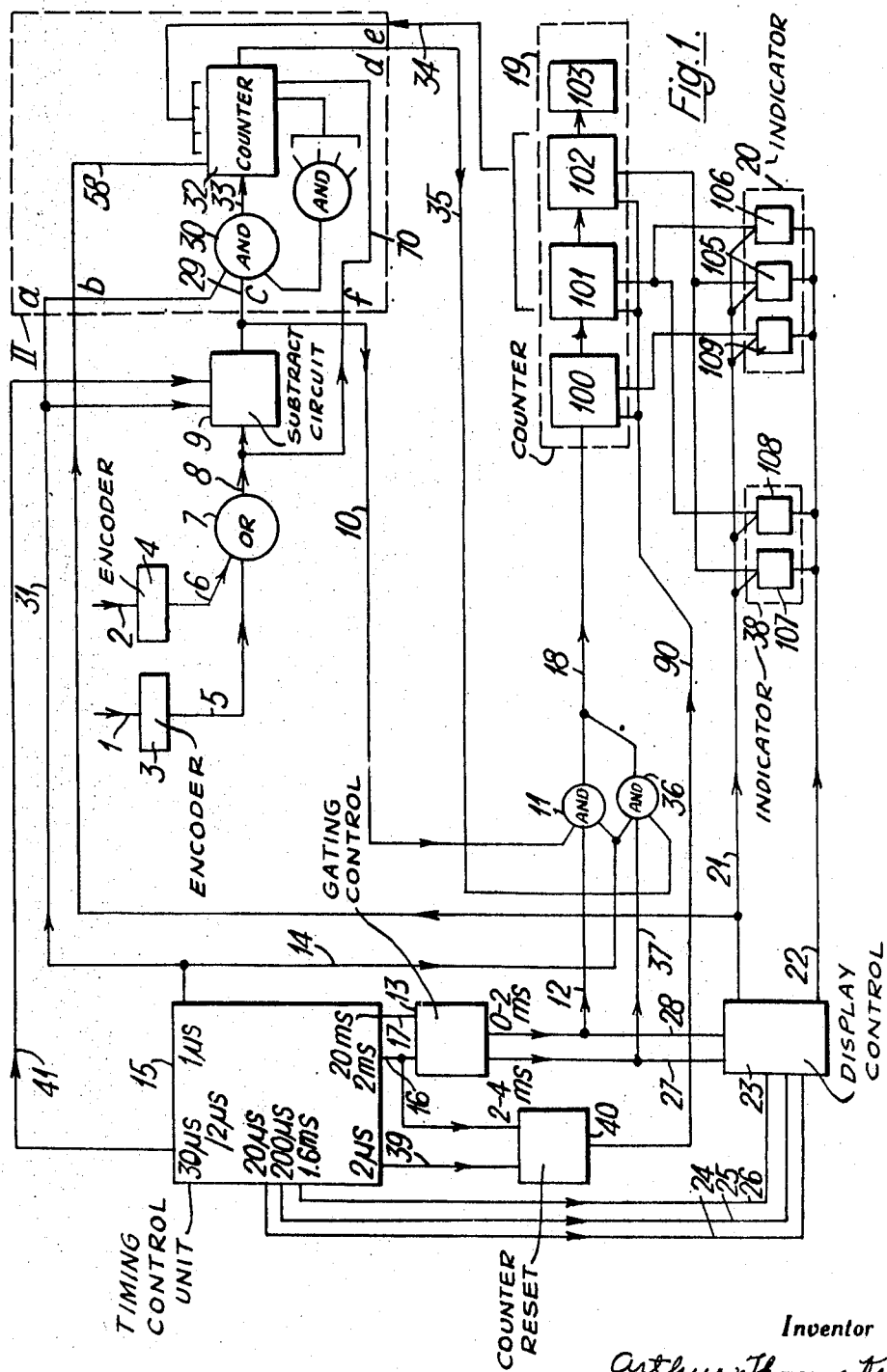
FIG. 1 is a schematic block diagram of the converter.

The converter is designed for converting into digital form the analogue output signals indicative of liquid level obtained from a liquid level gauge of the same general type described in the patent specification previously referred to. It is particularly designed for use with a gauge having a range of 25 meters and including a pair of potentiometers geared together so that one representing fractions of double decimeters and of the continuous rotation-type rotates at five times the speed of the other which represents the number of double decimeters and is of the 10 turn helical-type. Each potentiometer produces a respective analogue signal varying between 0 and −6 volts. It can hence be seen that 1 rotation of the 10 turn potentiometer is equivalent to 2.5 meters, i.e. 12.5 double decimeters, and one rotation of the other potentiometer is equivalent to one double decimeter. In other words each "multiple" is one double decimeter.

Before describing the converter, the advantages of using double decimeters will be considered. As previously mentioned most potentiometers cannot resolve accurately below 1 percent of their range. Accordingly if the continuous rotation potentiometer indicates 1 meter per revolution, resolution of much below 10 mm. cannot be achieved.

However if one revolution represents 2 decimeters, then resolution down to 2 millimeters can be achieved. This however naturally means that the other potentiometer has to represent a large number of multiples, in fact 125. This requires that it should be capable of resolution to 1/125 percent or 0.8 percent which in practice is attainable with a conventional potentiometer. In effect therefore the range of 25.000 meters is represented by 125 double decimeters each containing 200 millimeters instead of by 25 meters each containing 1000 millimeters.

In a gauge having a range of 80 feet, the same problem does not arise because the number of multiples, i.e. feet is larger. In other words 80 feet is conveniently represented by 80 feet each containing 12 inches. If the inches potentiometer resolves down to 1 percent then this gives accurate measurements down to 0.01×12=0.12 inches or approximately one-tenth of an inch.

To enable a better understanding of the operation of the gating circuits and counters, we will first describe the control unit which controls the timing of enabling signals and pulses to be counted. The block 15 is the basic timing control unit and incorporates a crystal clock having a frequency of 1 Mc/s. A pulse signal at this frequency is applied to lines 14 and 31. The pulse trains on these lines are applied through gates to counters in a manner which will be described later. The clock generator output is also applied within the unit 15 to a bistable circuit which provides a square wave output signal having a period of 2 microseconds, this signal being applied to line 39. The 2 microsecond signal is also applied, within the unit 15, to a decade counter used as a divider to reduce the signal frequency by a factor of 10 and to produce a square wave output signal having a period of 20 microseconds, applied to line 24. Similarly, the 20 microsecond signal is further reduced in frequency by a decade counter, within the block 15, to give a 200 microsecond signal on line 25. Further decade counters reduce the frequency still further to provide a 2 millisecond square wave signal on line 16 and a 20 millisecond signal on line 17.

Finally, a signal is derived from these counter dividers to provide a pulse of duration 30 microseconds occurring every 2 milliseconds on line 41, and a pulse of duration of 1.6 milliseconds on line 26. The crystal-controlled clock frequency generator, the bistable circuits and the decade counters within the unit 15 are all of conventional design.

Lines 16 and 17 convey the 2 millisecond and 20 millisecond square wave signals to the gating control unit 13. This is again a conventional switching circuit controlled by the 2 millisecond and 20 millisecond square wave signals to pass to conductor 12 a 2-millisecond signal beginning at time zero in the 20-millisecond cycle to conductors 12 and 28, and to pass to conductors 37 and 27 a 2-millisecond signal beginning at the end of the signal on conductor 12. Conductors 37 and 12 extend to AND gates 11 and 36 and conductors 27 and 28 go to display unit 23. It will be seen that the 1 Mc/s. pulse train on line 14 is also applied to the gates 11 and 36 and that these gates have further input connections from lines 10 and 35. Consequently in the period 0 to 2 milliseconds of the cycle the gate 11 will pass the 1 Mc/s. pulses from line 14 if there is an enabling signal on line 10. From 2 to 4 milliseconds of the cycle the gate 36 will pass the 1 Mc/s. pulses from line 14 if there is an enabling signal on line 35. The manner in which these enabling signals are derived will now be described.

In the following description the "double decimeter" units will be referred to simply as units, the amount in excess of the integral "double decimeter" units as the remainder, and the sum of the units and the remainder as the total. An analogue signal from the "coarse" potentiometer representing the total is applied along line 1 to an encoder 3. An analogue signal from the fine potentiometer representing the remainder only is applied along line 2 to encoder 4. The encoder 3 converts its coarse input analogue signal into a pulse signal having a pulse duration proportional to the sum of the coarse input and a bias proportional to 1 decimeter (one-half unit). The encoder 4 merely converts its input analogue signal into a pulse signal having a pulse duration proportional to the input signal amplitude. These encoders may be of the form disclosed in U.S. Pat. No. 3,475,727, assigned to the assignees of the present application.

The encoders 4 and 3 are gated by the 0—2 millisecond and 2—4 millisecond pulses, respectively, in each 20 millisecond cycle, to pass their signals sequentially to an OR gate 7, from which the signals are applied over a line 8 to a circuit 9. The circuit 9 will be referred to as a "subtract 30" circuit. The characteristics of the encoders are such that they include a fixed offset of 30 microseconds, this being desirable to indicate that the encoders are operating correctly. This fixed offset is subtracted by the circuit 9, which is basically a bistable circuit switched to its alternative state by the pulse received over line 41. This pulse occurs 30 microseconds after time zero and is repeated every 2 milliseconds. In this alternative state, the circuit 9 effectively transmits the signal on its input line 8 to its output lines 10 and 29. When the signal on line 8 ceases, the bistable circuit switches back to its original condition. In this way 30 microseconds are subtracted from the pulse length of the pulse on line 8 and the remainder of this pulse is effectively transmitted to lines 29 and 10.

We will first consider the "fine" signal from the encoder 4. This pulse is generated by the encoder 4 at the beginning of the 20 millisecond cycle and is delayed by 30 microseconds, as explained above. Thus a pulse beginning after 30 microseconds and having a duration up to 1 millisecond, representing in length the remainder, is applied over line 10 to gate 11. It will be remembered that gate 11 has another input line 12 which, during the first 2 milliseconds of the cycle, receives a signal from circuit 13, and a third input line 14 over which the clock pulse train reaches the gate. Consequently, the clock pulse train passes through to line 18 for the duration of the signal 10. In other words, the number of pulses applied over line 18 to a counter 19 is proportional to the pulse length on line 10 and therefore proportional to the fraction or remainder in excess of the integral number of units. As the units are "double decimeters," the counter 19 counts the number of millimetres in excess of the double decimeters, with a maximum of 199 millimeters. The counter 19 comprises three binary decades 100, 101 and 102, and a bistable store 103. The two least significant digits of the millimeter remainder are contained in decades 101 and 102 and the most significant digit, which must be either a one or a zero, is stored in the store 103.

As the maximum length of the pulse on line 10 is 1 millisecond, this pulse will have ended by 1.030 milliseconds from time zero. At 1.600 milliseconds from time zero, a resetting pulse is applied over line 22 to the indicator for 20 microseconds and immediately after a 200 microsecond pulse on line 21 strobes the value in the decades 101 and 102 into the digit displays 105 and 106 of a millimeters indicator 20.

We have thus described how in the first 2 milliseconds of the 20 millisecond cycle the millimeter remainder is converted into a pulse duration and then into a pulse train which is counted and the result displayed in the indicators 105 and 106. We will now describe how this is accomplished for the integral units of height. It will be remembered that the signal from the coarse potentiometer is linearly related to the total of integral units and remainder and consequently it is necessary to subtract from this total the remainder. It is also necessary to avoid the error which would result if the fine signal represented a remainder slightly greater than the remainder component of the coarse signal; in such a case, when the fine signal is "subtracted" from the total the resulting coarse signal would represent just less than the correct number of units (e.g. 1.99 instead of 2) and consequently would give an incorrect units indication. To avoid this the half-unit of bias is added by the encoder.

At 2 milliseconds from time zero, the signal on line 12 terminates and consequently gate 11 is unable to respond to further signals from the circuit 9. At the same time gate 36 receives over line 37 a 2 millisecond signal from circuit 13.

Figure 2:
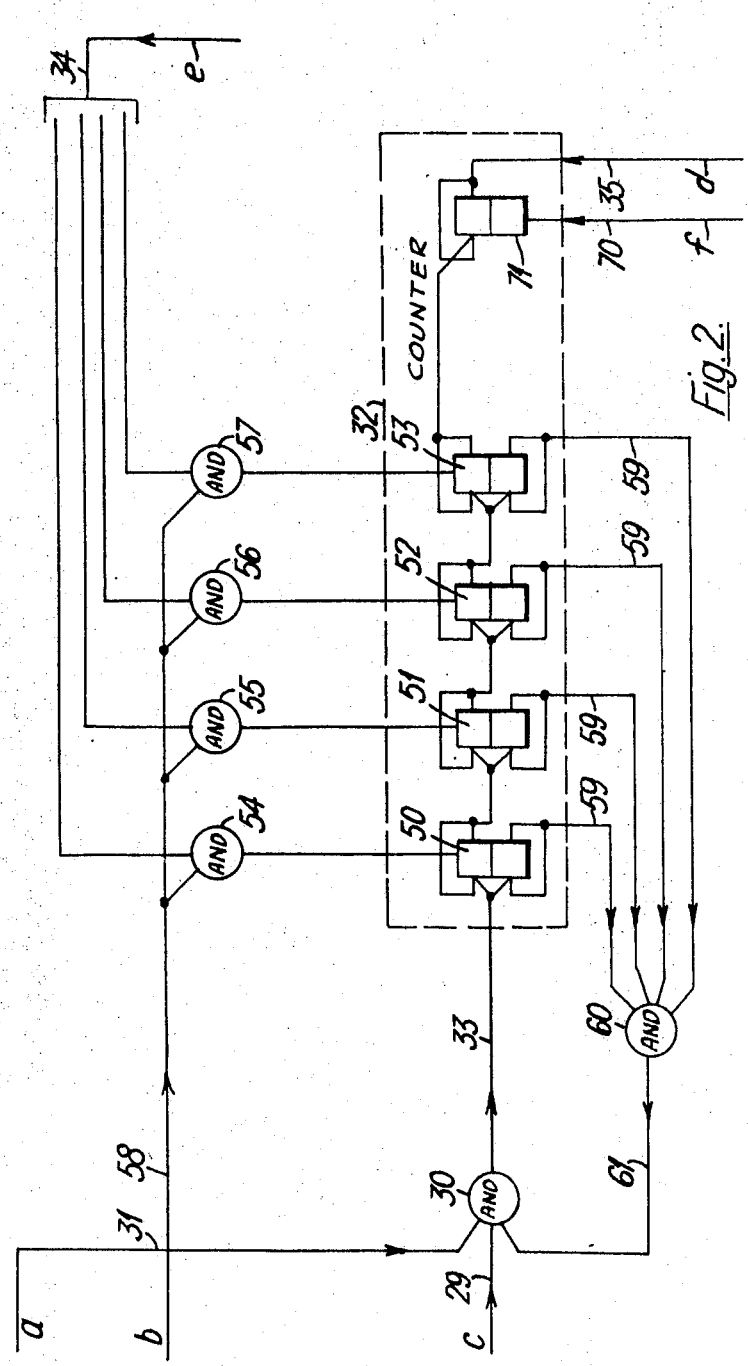
FIG. 2 is a more detailed block diagram of that part of the converter indicated as II in FIG. 1.

The pulse representative of the total (supplemented by the bias) after leaving the "subtract 30" unit 9 is applied by a line 29 to an AND gate 30. This gate also receives the clock pulse train over line 31 and, when enabled by a third input to be described later, passes the clock pulse over conductor 33 to counter 32 for the duration of the pulse on line 29. Prior to this, however, a number of pulses proportional to the value of the remainder in the counter 19 has been applied along a line 34 to the counter 32 and the counter now functions to subtract the pulses on line 34 from the pulses on line 33 in a manner which results in the remainder being effectively subtracted from the total and bias. The manner in which this is achieved will be described in connection with FIG. 2. In FIGS. 1 and 2, corresponding lines extending to and from the circuit of FIG. 2 are indicated by the reference letters a to f.

As shown in FIG. 2, the unit 32 includes a four-stage binary counter having stages 50, 51, 52 and 53. Before the pulses are received along line 33, signals are received along the line 34 which, as shown in FIG. 2, is actually four separate lines. These signals correspond to the complement of the value of the remainder in the counter 19 and they are gated by AND gates 54, 55, 56 and 57 into the stages 50 to 53. The gating signal for the gates 54, 55, 56 and 57 into the stages 50 to 53. The gating signal for the gates 54 to 57 is obtained over line 58 from the display control unit 23 which controls the strobing of the millimeter digits into the display stages 105 and 106 and thus takes place before the end of the first 2 milliseconds from time zero. At the end of 2 milliseconds, the coarse encoder 3 applies its signal through the OR gate 7 to the circuit 9, in which 30 microseconds is subtracted from the pulse duration in the manner described above. The coarse signal is also applied over line 70 (FIG. 2) to a bistable circuit 71. The coarse signal passing through the gate 9 is effective to cause the gate 30 to pass the clock pulses on the line 31, the gate 30 having at that time an input signal on line 61, as will be described. The clock pulses passed by the gate 30 enter the counter and cause this counter to count to zero, whereupon the counter switches the bistable circuit 71 to its alternative state. In addition, when the counter reaches zero the signals on line 59 switch an AND gate 60 so that its output level is such that the gate 30 is rendered nonconductive to the clock pulses. Accordingly, the counter ceases counting when it reaches zero. The effect of the counter is to hold the bistable circuit 71 unresponsive to the pulse on line 70 for a length of time proportional to the remainder from counter 19. At the end of this time, the pulse on line 70 is effectively transmitted by the bistable circuit 71 to the line 35 and thence to the gate 36.

Accordingly, the length of the pulse which passes through to the line 35 represents the integral number of units of double decimeters plus one half-unit of bias (1 decimeter). This pulse enables the gate 36 to pass the clock pulses on line 14 and consequently the counter 19, which has been reset since counting the "fine" pulse train, now receives a number of clock pulses proportional to the integral number of units plus the half-unit bias, to which is added the half-unit (if any) in the store 103. The pulse on line 35 will commence at time 2.030 milliseconds and has a maximum duration of 1.255 milliseconds. Consequently, it will have terminated by 3.255 milliseconds from time zero. In the period following 3.600 milliseconds from time zero the units value in the counter is strobed into the two displays 107 and 108 of a meters indicator 38 and into the decimeter display 109 of the indicator 20 by a signal on line 21, from the display unit 23. Hence the two indicators 38 and 20 display the meters and millimeters reading of the surface level.

Although the converter just described operates in double decimeters and fractions of double decimeters, it can easily be redesigned to operate in other scales, for instance feet and inches. Moreover the converter can also be modified so as to additionally sample other parameters such as temperature.

In the case of feet and inches, it is usually necessary to convert the inches reading into tenth feet before subtraction takes place. This may be carried out very approximately without affecting the overall accuracy of the reading on the feet indicator. For instance a diode matrix may be used or alternatively what is effectively a binary conversion process may be carried out as shown in the following table.

| Inches: | Tenth Feet |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1000 |
| 11 | 1001 |

It can be seen from this that considerable approximation takes place but in practice this is found quite satisfactory.

I claim:

1. An analogue-digital converter for converting into digital form coarse and fine analogue-voltage levels, said coarse voltage level representing units plus remainder and said fine voltage level representing remainder only, the converter comprising:

encoding means for converting said coarse and fine voltage levels to coarse and fine pulses, the durations of which are linearly related to said voltage levels, said encoding means extending said coarse pulse duration by a bias equivalent to a part of a unit;

a clock pulse generator for generating a pulse train;

counting means;

first gating means responsive to the fine pulse from said encoding means to gate the pulse train from said generator into said counting means for the duration of said fine pulse, whereby the fine count in said counting means represents said fine voltage level;

second gating means responsive to the coarse pulse from said encoding means to gate the pulse train into said counting means to give a coarse count;

inhibiting means responsive to said fine count, representing said remainder, and limiting the application of pulses to said counting means, during said coarse count, to the portion of said coarse pulse duration representing units plus bias;

means for indicating the fine count of said counting means;

and means for indicating the units represented by the coarse count of said counting means, said bias serving to prevent ambiguity in the units reading.

2. An analogue-digital converter as defined in claim 1, wherein said inhibiting means is connected between said encoding means and said second gating means to prevent the passage of said coarse pulse, said inhibiting means being coupled to said counting means to inhibit the coarse pulse for a duration proportional to the fine count, whereby the pulse train passed by the second gating means into the counting means has a duration proportional to the units component of the coarse signal, supplemented by the bias.

3. A converter as defined in claim 2, wherein said inhibiting means responsive to the fine count includes further counting means set in accordance with the fine count, third gating means responsive to the coarse pulse to gate a pulse train from said clock generator into said further counting means to cause said further counting means to count back to zero, and a circuit operative when said further counting means reaches zero to pass the remainder of the coarse pulse to said second gating means.

4. A converter as defined in claim 1, and including a gauge the output of which is connected to the input of the converter for measuring the surface level of a liquid.

5. A converter as defined in claim 1, in which the fine signal represents millimeters and the coarse signal represents double decimeters.